United States Patent
Moe et al.

(10) Patent No.: US 8,728,178 B2
(45) Date of Patent: May 20, 2014

(54) LIGHTER FLUID COMPOSITIONS WITH N-BUTANOL AND BIODIESEL

(75) Inventors: David E. Moe, Mendota Heights, MN (US); Reed E. Oshel, Lees Summit, MO (US)

(73) Assignee: Greenflame Products, LLC, Minneapolis, MN (US)

( * ) Notice: Subject to any disclaimer, the term of this patent is extended or adjusted under 35 U.S.C. 154(b) by 517 days.

(21) Appl. No.: 12/831,469

(22) Filed: Jul. 7, 2010

(65) Prior Publication Data
US 2011/0008507 A1   Jan. 13, 2011

Related U.S. Application Data

(60) Provisional application No. 61/223,762, filed on Jul. 8, 2009.

(51) Int. Cl.
 *C10L 1/18* (2006.01)

(52) U.S. Cl.
 USPC .............................................. 44/388; 44/451

(58) Field of Classification Search
 USPC .................................................. 44/388, 451
 See application file for complete search history.

(56) References Cited

U.S. PATENT DOCUMENTS

| | | | |
|---|---|---|---|
| 4,359,324 A * | 11/1982 | Elsea et al. ....................... | 44/308 |
| 5,252,107 A | 10/1993 | Wilkins, Jr. | |
| 6,843,812 B2 | 1/2005 | Stephanos | |
| 7,037,348 B2 | 5/2006 | Freisthler | |
| 2005/0115145 A1 | 6/2005 | Decker et al. | |
| 2008/0014539 A1 | 1/2008 | Pisklak et al. | |

FOREIGN PATENT DOCUMENTS

WO   02053673 A2   7/2002

OTHER PUBLICATIONS

Knothe, Biodiesel:The Use of Vegetable Olls and their derivatives, 1997,ACS,pp. 172-208.*
Jesus, Alexandre De et al., The use of microemulsion for determination of sodium and potassium in biodiesel by flam atomic absorption spectrometry, Talanta, vol. 74, pp. 1378-1384, Sep. 19, 2007. See Abstract, pp. 1380-1383.
Agarwal, Avinash Kumar, Biofuels (alcohols and biodiesel) applications as fuels for internal combustion engines. Progress in Energy and Combustion Science, vol. 33, pp. 233-271, Nov. 27, 2006. See Abstract, pp. 245-268.
Ribeiro, Nubia M. et al., The role of additives for diesel and diesel blended (Ethanol or Biodiesel) Fuels: A review, energy & fuels, vol. 21.
PCT International Search Report, Feb. 24, 2011.
PCT Written Opinion, Feb. 23, 2011.

* cited by examiner

*Primary Examiner* — Cephia D Toomer
(74) *Attorney, Agent, or Firm* — Westman, Champlin & Koehler, P.A.; Z. Peter Sawicki; Amanda Prose

(57) ABSTRACT

An improved, environmentally friendly lighter fluid composition made from renewable resources is described that includes n-butanol and biodiesel. This lighter fluid has reduced VOCs compared to a petroleum-based lighter fluid. The fuel sources such as charcoal ignited with the lighter fluid composition maintain desirable temperature profiles. Food cooked using the lighter fluid composition as the ignition source have improved taste characteristics due to reduced VOCs. Methods of using the lighter fluid compositions are also described.

7 Claims, 2 Drawing Sheets

LIGHTER FLUID COMPOSITIONS WITH N-BUTANOL AND BIODIESEL

CROSS-REFERENCE TO RELATED APPLICATION

The present application is based on and claims the benefit of U.S. provisional patent application Ser. No. 61/223,762, filed Jul. 8, 2009, the content of which is hereby incorporated by reference in its entirety.

BACKGROUND OF THE INVENTION

Grilling foods on a barbecue has long been a favorite summertime activity and this has increased in popularity in more recent times because barbecuing has been viewed as a healthy, easy and flavorful method for cooking meats and vegetables. The use of lighter fluid to facilitate the charcoal ignition is a long accepted method. Lighter fluid is typically spread over a bed of charcoal and allowed to soak into the charcoal. After a few minutes, the charcoal bed is ignited and the lighter fluid is allowed to combust and burn away to leave a bed of hot coals suitable for cooking.

While the use of lighter fluid greatly enhances the preparation of coals for cooking food, there are multiple drawbacks to using the lighter fluid. These include a residual hydrocarbon odor imparted on the food cooked using lighter fluid, a safety risk associated with fire due to the low flashpoint in lighter fluid compositions and also the emission of volatile organic compounds or "VOCs" during combustion of lighter fluid.

Currently, "green" technology that refers to use of renewable resources or environmentally friendly technology is preferred over the use of non-renewable resources. Thus, minimizing the use of non-renewable resources in everyday life is a desirable goal. Many lighter fluids are known and typically include a flammable hydrocarbon mixture. The hydrocarbon mixtures that have been used in lighter fluids are generally derived from fossil fuels. These lighter fluids are from non-renewable energy sources and do not qualify as a "green" product.

SUMMARY OF THE INVENTION

In one aspect, the present invention comprises a lighter fluid composition. The lighter fluid composition includes n-butanol and biodiesel wherein the n-butanol is at least about 60 percent by weight and the biodiesel is less than about 40 percent by weight. The lighter fluid composition has desirable lighter fluid characteristics.

In another aspect, the present invention includes a method of lighting a fuel source. The method includes depositing a lighter fluid composition over the fuel source wherein the lighter fluid composition comprises n-butanol and biodiesel. The method further includes igniting the lighter fluid composition.

In yet another aspect, the present invention includes a method of making a hot bed of coals. The method includes depositing a lighter fluid composition over a bed of coals wherein the lighter fluid composition comprises n-butanol and biodiesel. The method further includes igniting the lighter fluid composition.

In a further aspect, the present invention includes a method of cooking food. The method includes providing an ignited fuel source wherein the fuel source was ignited with a lighter fluid composition comprising n-butanol and biodiesel. The method also includes placing uncooked food on a cooking surface over the ignited fuel source and cooking the food until the desired food temperature is reached.

DETAILED DESCRIPTION OF ILLUSTRATIVE EMBODIMENTS

Figure 1:
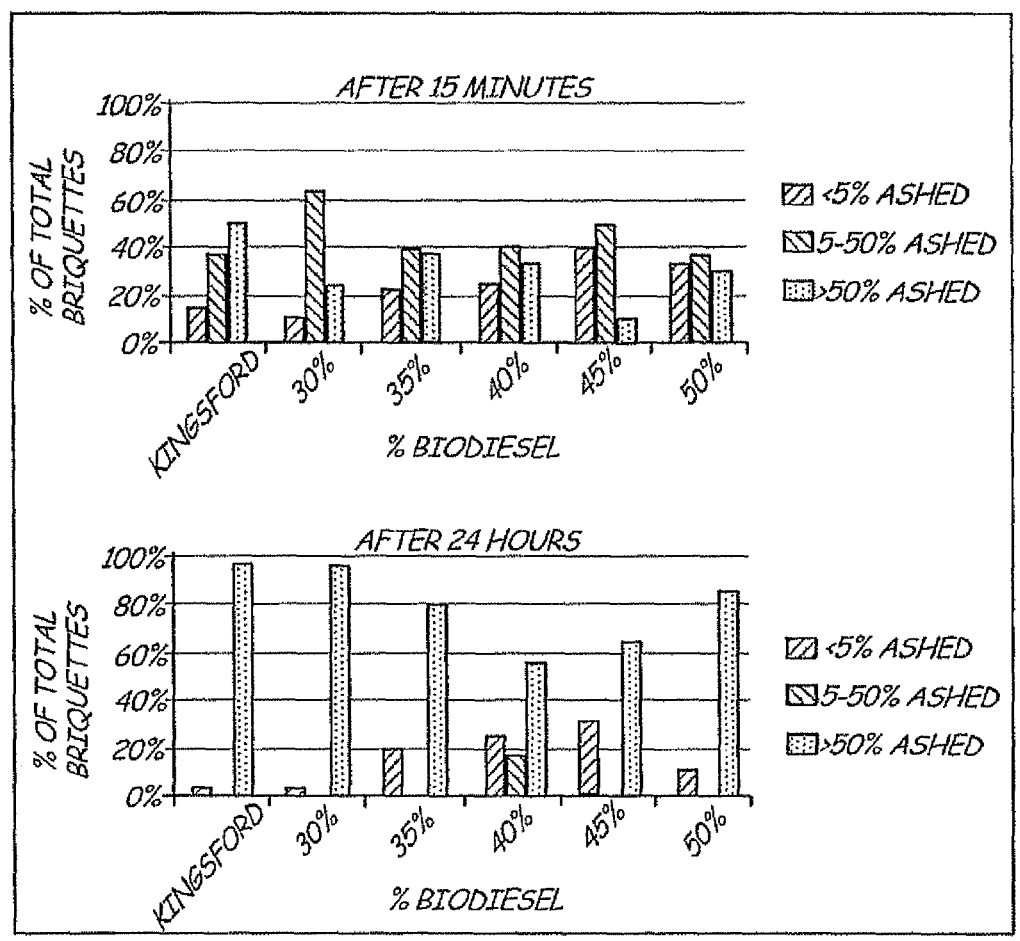
FIG. 1 is a graphical view of the ashing of charcoal briquettes using various formulations of lighter fluid.

Environmentally friendly charcoal lighter fluids have been developed having compositions that include at least one component derived from renewable resources. These lighter fluids of the present invention have desirable lighting characteristics and when compared to petroleum based lighter fluids have reduced emissions of volatile organic compounds (VOCs). These lighter fluids also have a desirable safety profile and storage stability. The lighter fluid compositions include n-butanol, preferably bio-butanol, and biodiesel.

"n-butanol" as referred to herein relates to any butanol and may be derived from petroleum or from non-petroleum based resources.

Bio-butanol" as referred to herein relates to non-petroleum derived n-butanol and is generally produced from renewable resources such as corn, wheat, sugar, beet, sorghum, cassava and sugarcane.

"Diesel" as referred to herein relates to any diesel and may be derived from petroleum or from non-petroleum based resources.

"Biodiesel" as referred to herein relates to non-petroleum based diesel fuel containing long chain alkyl esters.

The lighter fluid compositions of the present invention include alcohol, preferably derived from renewable resources. Generally, the alcohol used in the lighter fluid composition can be any short chain or low molecular weight alcohol with a preference for C1-C5 alcohols. Preferably, the alcohol is a C-4 alcohol, n-butanol, and more preferably, bio-butanol. n-Butanol is generally made from fossil fuels but the bio-butanol used in the preferred compositions is produced from agricultural feedstocks such as corn, wheat, and the like.

The lighter fluid composition may include a combination of petro-derived n-butanol and bio-butanol. If a mixture of petro-derived butanol and bio-butanol are used in the composition, the ratio of bio-butanol:petro-butanol can vary. Preferably, ratio is at least 1:1. Ratios greater than 1:1 or less than to 1:1 are also within the scope of this invention.

The lighter fluid composition of the present invention generally includes at least about 50 percent by weight of n-butanol. Preferably, the lighter fluid composition includes at least about 60 percent by weight of the n-butanol. More preferably, the lighter fluid composition includes about 70 percent by weight of n-butanol.

The lighter fluid composition also includes diesel, preferably biodiesel. The diesel may include a combination of petro-derived diesel and biodiesel. If a mixture of petro-derived diesel and biodiesel are used in the composition, the ratio of bio-diesel:petro-diesel can vary. Preferably, ratio is at least 1:1. Ratios greater than 1:1 or less than to 1:1 are also within the scope of this invention.

Biodiesel used in the lighter fluid composition generally contains a mixture of long chain alkyl esters and can be made by transesterification of vegetable oil or animal fat (tallow). In preferred embodiments, biodiesel includes fatty acid methyl esters (FAMEs). The FAMEs can be a mixture in which the fatty acids have carbon chain lengths generally between 14 carbons and 24 carbons (C14-C24 methyl esters).

The biodiesel used in the lighter fluid compositions are generally methyl esters having a mixture of fatty acids of varying carbon length. In some preferred embodiments, the biodiesel is derived from soybean oil. The lighter fluid composition generally includes less than about 50 percent by weight of the biodiesel. Preferably, the lighter fluid composition includes less than about 40 percent by weight of biodiesel. Most preferably, the lighter fluid composition includes about 30 percent by weight of biodiesel.

In preferred embodiments, the lighter fluid composition includes about 70 percent by weight of the butanol and about 30 percent by weight of the biodiesel.

The lighter fluid composition described herein can be used to ignite a number of fuel sources, preferably carbonaceous fuel sources. These fuel sources include charcoal, wood, paper and the like. Ignition of other fuel sources is also within the scope of the invention.

The lighter fluid compositions of the invention have a number of advantages and/or desirable characteristics when used to ignite fuel sources such as charcoal compared to a petroleum-based lighter fluid. The lighter fluid compositions described herein can have lower smoke production and lower VOC emissions compared to the petroleum-based lighter fluids. In addition, the flashpoint, storage stability and cooking temperature profile are similar to or better than the petroleum-based lighter fluids. Foods cooked using the lighter fluids described herein can have a better taste profile.

The flashpoint of a liquid can determine whether a liquid is flammable or combustible. In the United States, liquids that have flashpoints below 100° F. are classified as flammable whereas liquids that have flashpoints between 100° F. and 200° F. are classified as combustible. This classification is used by many organizations including the Environmental Protection Agency (EPA) and National Fire Protection Association. This classification can determine the methods that have to be used to package, transport or store a liquid.

The lighter fluid compositions of the present invention are generally combustible. The flashpoint of the lighter fluid composition can be at least above 100° F. Preferably, the flashpoint of the lighter fluid composition is about 102° F. or above and more preferably, about 107° F.

During combustion of the lighter fluid, smoke may be generated. Advantageously, the lighting fluid compositions of the present invention generally produce less smoke upon combustion than lighter fluids that do not contain biodiesel, i.e. petro-derived lighter fluids. See Example 1 below.

The lighter fluid compositions described herein generally have lower VOC emissions than petro-based lighter fluids. Reduced VOC emissions can lead to food that has an improved taste profile. The only established test in the United States for VOC emissions from barbecue ignition products is the South Coast Air Quality Management District's (SCAQMD) Rule 1174 that sets a limit of 0.020 lb. VOC per typical charcoal start. The amount of VOC emissions for the lighter fluid compositions of the present invention can be less than about 0.020 lb/start. Preferably, the amount of VOC emissions are less than about 0.0150 lb/start and more preferably, the amount of VOC emissions are about 0.010 lb/start or lower.

The lighter fluid compositions of the invention can be used to attain maximum temperature of the fuel source of at least 350° F. and preferably attain a maximum temperature of at least about 375° F. Using the lighter fluid composition, the fuel source may attain a temperature of at least about 350° F. in less than about 30 minutes. Preferably, the fuel source may attain a temperature of at least about 350° F. in less than about 20 minutes.

Fuel source ignited using the lighter fluid composition described herein can maintain a temperature of about 350° F. at least about 20 minutes. Preferably, the fuel source can maintain a temperature of about 350° F. for at least about 30 minutes. More preferably, the charcoal can maintain a temperature of about 350° F. for at least about 40 minutes.

The lighter fluid compositions described herein are generally stable compositions at room temperature and at elevated temperature. Elevated temperatures may be temperatures between about 30° C. and about 70° C. The composition can be stored at room temperature for at least about 10 days and maintain desirable ignition characteristics as described in the Examples 4 and 5. Preferably, the lighter fluid compositions can be stored at room temperature for at least about 30 days and more preferably at least about 8 months and still maintain desirable characteristics. In some embodiments, the lighter fluid composition is stored at an elevated temperature for at least about 30 days and still maintains desirable characteristics.

Methods of lighting fuel sources are also contemplated in the present invention. The fuel sources can be charcoal, wood, paper and the like. The methods include depositing the lighter fluid composition on a fuel source and igniting the composition. Generally, flames are produced upon ignition and remain until the lighter fluid is substantially combusted. In a specific embodiment, the lighter fluid is spread over a bed of charcoal. In some embodiments, the lighter fluid is allowed to soak into the fuel source for a length of time before igniting. The lighter fluid composition can be allowed to soak, for example, for at least about one minute or longer. Preferably, the composition may be allowed to soak into the fuel source for a period of about two minutes or longer prior to ignition. The lighter fluid composition used in the methods can be any of the compositions described above.

The amount of lighter fluid composition used on a fuel source can vary. Preferably, the amount of lighter fluid composition used is between about 1.4 fluid ounces per pound of charcoal and about 1.8 fluid ounces per pound of charcoal. Amounts of lighter fluid per pound of charcoal outside of this range are also within the scope of this invention.

The methods include lighting the fuel sources and allowing the fuel to reach a temperature of at least about 325° F. and preferably at least a temperature of about 350° F. When the temperature of the fuel source, i.e. charcoals, has reached the desired temperature, food may be placed on the grill for cooking. The food can be cooked on the grill until desired doneness. The food cooked on a grill using lighter fluid compositions described herein as the ignition source for the fuel have a desirable flavor and reduced off flavors.

The present invention includes a method of making a bed of hot charcoals. The method includes depositing a lighter fluid composition of the present invention over charcoal and igniting the lighter fluid. In preferred embodiments, the lighter fluid composition may be allowed to soak into the charcoal before ignition.

The present invention also includes a method of cooking food. The method includes providing an ignited fuel source and a cooking surface over the ignited fuel source. The fuel source can be ignited with a lighter fluid composition described herein. After the ignited fuel source reaches a desired temperature, the uncooked food is placed on the grill for a period of time until the food attains the desired doneness or temperature.

EXAMPLES

Example 1

Formulations and Smoke Evaluation

Approximately 200 mL of each n-butanol/biodiesel formulation was prepared at 5% intervals as indicated in Table 1. The biodiesel used was obtained from Magellan Analytical, Kansas City, Ks. It was produced from pure soybean oil, and met ASTM D6751-07a specification for fuel grade biodiesel. The n-butanol was obtained from Sigma Aldrich. The formulations were mixed by inversion, and stored in Nalgene® bottles.

TABLE 1

Formulation Preparation

| Formulation No. | % n-Butanol | % Biodiesel |
|---|---|---|
| 1 | 70 | 30 |
| 2 | 65 | 35 |
| 3 | 60 | 40 |
| 4 | 55 | 45 |
| 5 | 50 | 50 |

Smoke production during combustion of the formulations was assessed by lighting 5 ml of each formulation placed in a small shallow pan. Smoke production was observed. None of the formulations produced large amounts of smoke. However, small puffs of black smoke were observed more frequently when the percentage of biodiesel was increased in the formulation. All formulations produced significantly less smoke than Kingsford® lighter fluid.

Example 2

Charcoal Lighting Reproducibility

The ability of each formulation, described in Table 1, to effectively light charcoal briquettes was determined by adding ≈24.5 mL of each formulation to 10 charcoal briquettes arranged in a three-sided pyramid, and lighting it at the three corners of the stack. 15 minutes after flames were no longer observed, the briquettes were separated and placed on a rack. Since lit briquettes can light other briquettes they are in contact with, the separation of the briquettes was necessary to effectively assess the number of briquettes ignited solely by the different lighter fluids. Because the briquettes were separated, the results were not indicative of typical charcoal use. If briquettes are left in a pile or touching, all 10 briquettes would be expected to completely ash even if not all of the briquettes were ignited by the lighter fluid. The amount of ash on each briquette was categorized as ≤5%, 5% to 50%, or ≥50% when they were separated, and again after 24 hours.

The results of three trials with each formulation are summarized in FIG. 1. From the results, it was determined that the 70% n-butanol/30% biodiesel formulation was the most effective formulation for reliably lighting the charcoal. In fact, the 70% n-butanol/30% biodiesel formulation's performance equaled that of Kingsford® lighter fluid. Both Kingsford® and 70% n-butanol/30% biodiesel averaged a charcoal lighting rate of 97% over three trials.

Example 3

Instant Light Application Screening

The ability of the 70% n-butanol/30% biodiesel formulation to function in an instant light charcoal application was assessed. For testing the instant light capabilities, briquettes were treated in one of the following methods:
1. sprayed with the lighter fluid formulation until the entire briquette was wetted.
2. dipped in the formulation for 1 second
3. soaked in excess formulation for 5 minutes The treated briquettes were stored in Ziploc® freezer bags under ambient conditions.

Briquettes treated with the 70% n-butanol/30% biodiesel formulation were compared to briquettes treated with Kingsford® lighter fluid in the same manner, and Kingsford® Matchlight® charcoal. The Kingsford® Matchlight® charcoal was very effective if lit immediately after removing from the commercial packaging, but storage in the Ziploc® bags for even one day rendered the Matchlight® charcoal ineffective (see Table 2). The 70% n-butanol/30% biodiesel formulation performed comparable to Kingsford® lighter fluid with all three treatment methods, suggesting that, with the proper packaging, 70% n-butanol/30% biodiesel would perform as well as Kingsford® lighter fluid in an instant light application.

TABLE 2

Instant Light Test Results

| Entry | Sample | Method | Stored | Smoke | Ease of Ignition | After 15 Minutes[a] | After 24 Hours |
|---|---|---|---|---|---|---|---|
| 1 | Matchlight | NA | 1 day | 1 | 5 | ≤5% | 5%-50% |
| 2 | Kingsford | Spray | 1 day | 1 | 5 | ≤5% | ≤5% |
| 3 | Kingsford | Dip | 1 day | 1.7 | 4 | ≤5% | ≤5% |
| 4 | Kingsford | Soak | 1 day | 2 | 1 | 5%-50% | ≥50% |
| 5 | 70/30 | Spray | 1 day | 2 | 5 | ≤5% | ≤5% |
| 6 | 70/30 | Dip | 1 day | 2 | 4.3 | ≤5% | ≤5% |
| 7 | 70/30 | Soak | 1 day | 1 | 1 | 5%-50% | ≥50% |
| 8 | Matchlight | NA | 1 week | 1.7 | 5 | ≤5% | ≤5% |
| 9 | Kingsford | Spray | 1 week | 2 | 5 | ≤5% | ≤5% |
| 10 | Kingsford | Dip | 1 week | 1 | 5 | ≤5% | ≤5% |
| 11 | Kingsford | Soak | 1 week | 1 | 1.7 | 5%-50% | ≥50% |
| 12 | 70/30 | Spray | 1 week | 1.3 | 5 | ≤5% | ≤5% |
| 13 | 70/30 | Dip | 1 week | 2 | 5 | ≤5% | ≤5% |
| 14 | 70/30 | Soak | 1 week | 1.3 | 2 | 5%-50% | ≥50% |

[a]Percent of a single briquette ashed at the stated amount of time after burning of lighter fluid was complete.

Example 4

Cooking Temperature Reliability

The lighter fluid used in this Example was 70% n-butanol/ 30% biodiesel. The biodiesel used in this study was obtained from Prairie Pride, Inc., Deerfield, Mo. It was produced from pure soybean oil and met ASTM D6571-07a specification for fuel grade biodiesel. A temperature profile was recorded using a HOBO® "J, K, S, T Thermocouple" Data Logger equipped with a Type K 12-inch Probe Thermocouple having a recording range of 32° F. to 2282° F. during the burning of the charcoal after complete combustion of the lighter fluid.

The temperature profile was recorded by stacking 30 briquettes into a three-sided pyramid in the grill (Uniflame® 22" Kettle Charcoal Grill with 2.4 cu. ft. volume and 380 sq. in. of cooking space), adding 99 mL of lighter fluid evenly over the pyramid, and igniting the pyramid in three spots with a lighter. After no more flame was observed, the pyramid was toppled with tongs. The HOBO® temperature probe was then inserted into a side hole in the grill lid and the HOBO® logger was set to record the probe and ambient temperature every 15 seconds for approximately 1 hour before the temperature probe was removed.

Figure 2:
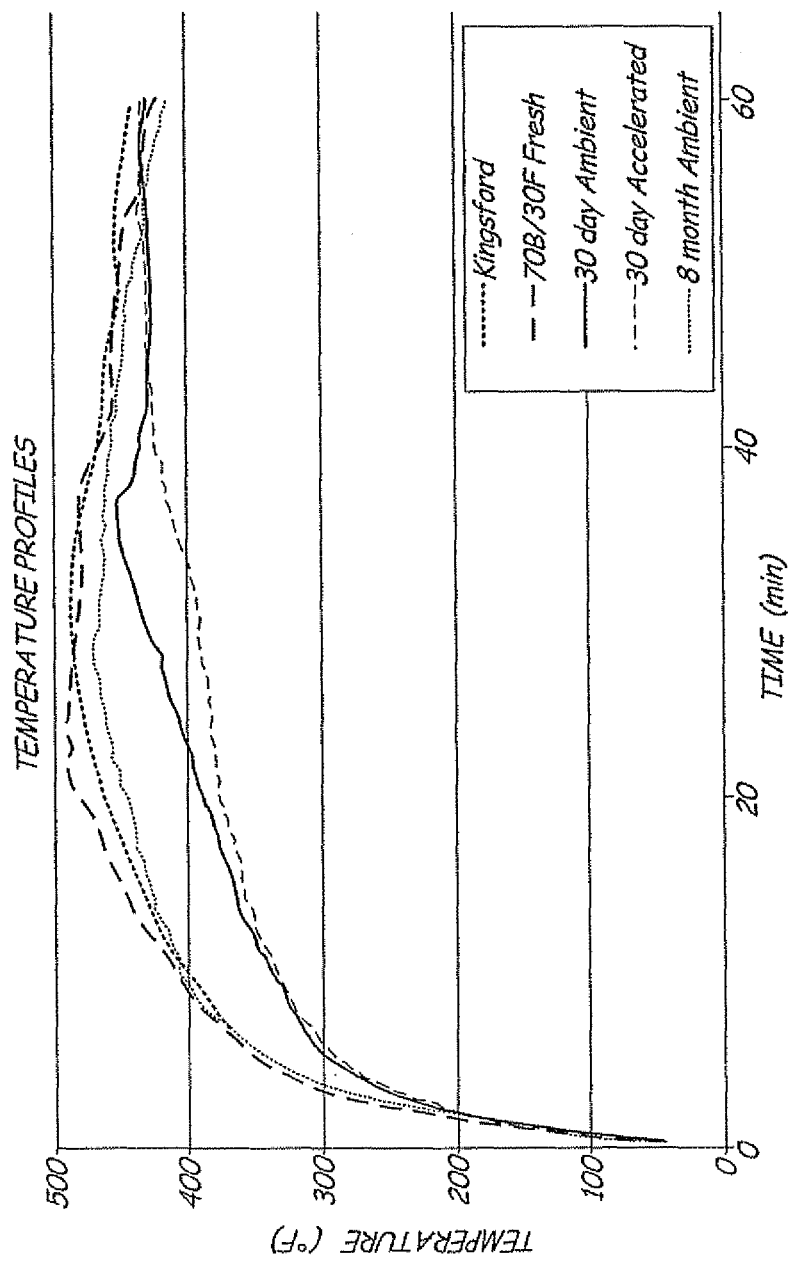
FIG. 2 is a graphical view of the temperature profiles using different lighter fluid formulations and storage conditions.

The average temperature profile over three trials of the 70B/30F formulation was very similar to that of Kingsford® (FIG. 2). Both reached 350° F. in less than 10 minutes and maintained a temperature above 350° F. for the remainder of the test (see Table 3). The 70B/30F formulation did have a slightly higher average maximum temperature, but difference was with the margin of error.

TABLE 3

Burn Data for Grilling Surface Temperature Profiles

| Sample | Time to 350° (min) | Max temp (° F.) | Final temp (° F.) |
|---|---|---|---|
| Kingsford[1] | 6.5 ± 3.4 | 494.8 ± 46.4 | 438.3 ± 31.7 |
| Fresh[2] | 5.6 ± 3.2 | 517.6 ± 46.9 | 421.5 ± 36.4 |
| 8 month Ambient[3] | 5.4 ± 0.4 | 476.2 ± 38.6 | 413.4 ± 26.4 |
| 31 day Ambient[4] | 14.8 ± 11.3 | 475.4 ± 61.6 | 427.0 ± 0.0 |
| 31 day Accelerated[5] | 13.1 ± 4.1 | 436.4 ± 26.1 | 431.8 ± 29.2 |

[1]Commercially available petroleum based Kingsford lighter fluid.
[2]70B/30F formulation prepared the same day as testing.
[3]70B/30F prepared for MRI project number 310846, stored at ambient temperature for ≈8 months.
[4]70B/30F prepared at the same time as the fresh sample and stored for 31 days at ambient temperature.
[5]70B/30F prepared at the same time as the fresh sample and stored for 31 days at ≈60° C.

Example 5

Storage Stability

The stability was assessed based on the temperature profile as described above in Example 4. Formulations were prepared using biodiesel that met ASTM D-6571 specifications for biodiesel, and stored at both ambient and elevated temperatures (≈60° C.) for 31 days to assess reasonable storage stability information. A formulation prepared during the previous effort and stored for 8 months at ambient temperature was also analyzed. The ambient and accelerated 31-day storage stability samples were run in duplicate and compared to temperature profiles obtained during Cooking Temperature Reliability (Example 4).

The 31-day ambient and 31-day accelerated stability samples showed slightly lower performance in their grilling surface temperature profile; however, it has been concluded that the lower performance was most likely due to environmental factors during the testing and not the storage stability of the formulation based on the following: (1) The sample stored for eight (8) months under ambient conditions performed very similar to the fresh formulation, (2) The 31-day ambient and 31-day accelerated stability samples were obtained on the same day about a month after the Fresh and 8-month ambient storage sample when weather conditions were different.

Example 6

VOC Emissions Evaluation

The VOC Emissions rate for 70% 1-butanol/30% biodiesel formulation was calculated using an average of three 10-second readings from a Ratfisch continuous hydrocarbon analyzer collected during a 25-minute burn test. This was a preliminary test to estimate the formulations ability to meet South Coast Air Quality Management District's (SCAQMD) Rule 1174 that sets a limit of 0.020 lb. VOC per typical charcoal start. Currently, SCAQMD Rule 1174 is the only standard established in the United States of America for VOC emissions from barbecue ignition products. Preliminary testing indicated emissions from the 70% n-butanol/30% biodiesel charcoal lighter fluid expected to pass SCAQMD certification according to SCAQMD method 25.1. Horizon Air Measurement Services, Inc., Newbury Park, Calif. performed the pre-testing and concluded that the expected emissions would be around 0.010 lb of VOC/start. The results are shown in Table 4.

According to the SCAQMD, some petroleum-based charcoal lighter fluids pass the 0.020 lb/start limit, but only by a narrow margin. In addition, instant light charcoal briquettes prepared with petroleum-based lighter fluid reach a minimum VOC emission level of 0.015 lb VOC/start. This would indicate that the 70% n-butanol/30% biodiesel formulation is estimated to have lower VOC emissions than even the best petroleum-based products.

TABLE 4

Barbecue Ignition Method Emission Results

| | Run 1 | Run 2 | Run 3 | Average |
|---|---|---|---|---|
| Stack Gas Characteristics | | | | |
| Temperature (° F.) | 84.4 | 90.4 | 88.9 | 87.9 |
| Velocity, (afm) | 472 | 478 | 478 | 476 |
| Flow Rate (dscfm) | 241 | 241 | 242 | 241 |
| VOC Emissions | | | | |
| Concentration (ppm) | 49.0 | 48.7 | 49.9 | 49.2 |
| Emission Rate[1] (lb VOC/Start) | 0.0108 | 0.0108 | 0.0109 | 0.0108 |
| Rule1174 Limitation (lbVOC/Start) | 0.020 | 0.020 | 0.020 | 0.020 |

[1]lb VOC expressed as $CH_2$

Although the present invention has been described with reference to preferred embodiments, workers skilled in the art will recognize that changes may be made in form and detail without departing from the spirit and scope of the invention.

What is claimed is:

1. A lighter fluid composition comprising n-butanol and biodiesel wherein the n-butanol is at least about 60 percent by weight and biodiesel is less than about 40 percent by weight, the lighter fluid composition having a flashpoint of above 100° F. and emissions of less than about 0.01500 lb VOC/start.

2. The lighter fluid composition of claim 1 wherein the n-butanol is about 70 percent by weight and the biodiesel is about 30 percent by weight.

3. The lighter fluid composition of claim 1 wherein the biodiesel comprises FAMEs.

4. The lighter fluid composition of claim 1 wherein the VOCs are less than about 0.0120 lb VOC/start.

5. The lighter fluid composition of claim 1 when applied to and soaking a fuel source attains a temperature of at least about 350° F.

6. The lighter fluid composition of claim 1 when applied to and soaking a fuel source attains a temperature of about 350° F. in less than about 30 minutes.

7. The lighter fluid composition of claim 1 wherein the n-butanol is biobutanol.

\* \* \* \* \*